United States Patent [19]

Mikkelsen

[11] Patent Number: 4,825,782

[45] Date of Patent: May 2, 1989

[54] SWEEP-SPIKE COMBINATION TILLAGE TOOL

[76] Inventor: James Mikkelsen, Mikes's Trailer Ct., No. 7, Devils Lake, N. Dak. 58301

[21] Appl. No.: 170,922

[22] Filed: Mar. 21, 1988

[51] Int. Cl.4 .................... A01B 35/26; A01C 23/02
[52] U.S. Cl. .................................. 111/123; 172/722; 172/730; 172/745
[58] Field of Search ............... 172/730, 724, 725, 733, 172/770, 721, 722, 700, 745; 111/6, 7

[56] References Cited

U.S. PATENT DOCUMENTS

| | | |
|---|---|---|
| 288,666 | 11/1883 | Roop . |
| 774,324 | 11/1904 | Hill et al. . |
| 1,567,035 | 12/1925 | Carr . |
| 1,611,337 | 12/1926 | Carr .................................... 172/722 |
| 1,630,585 | 5/1927 | Simons . |
| 1,769,545 | 7/1930 | Pence . |
| 1,908,903 | 5/1933 | Kovar . |
| 2,062,197 | 11/1936 | Thompson .......................... 172/722 |
| 2,699,104 | 1/1955 | Jaeger . |
| 2,889,788 | 6/1959 | Van Dorn . |
| 3,745,944 | 7/1973 | Yetter ................................. 111/7 |
| 4,204,579 | 5/1980 | Rau et al. . |
| 4,538,689 | 9/1985 | Dietrich, Sr. . |

Primary Examiner—Richard J. Johnson

Attorney, Agent, or Firm—Peterson, Wicks, Nemer & Kamrath

[57] ABSTRACT

A sweep-spike combination tillage tool (10) according to the preferred teachings of the present invention is disclosed including generally flat, horizontal sweep blades (18) located behind a spike (16) and above the point (28) of the spike (16). Specifically, the front corners of the sweep blades (18) between their front cutting edges (36) and inside edges (40) are integrally connected to the side edges (34) of the spike (16). Gussets (20) are provided having a first side (48) integrally connected generally perpendicular to the inside edges (40) of the sweep blades (18) and having a second side (50) integrally connected generally tangentially to the side edges (34) of the spike (16) to provide cantilever mounting of the sweep blades (18) and to provide support for soil passing over the spike (16) and the sweep blades (18) at their interconnection. Furrow fillers (22) are provided having top edges (52) integrally connected to the bottom faces (46) of the sweep blades (18) for moving the soil behind the implement shank (12) and the gussets (20). Applicators (64) may be provided behind point (28) of spike (16) and in front of sweep blades (18) for applying fertilizer. Thus, tool (10) according to the teachings of the present invention tills, fertilizes, and incorporates granular fertilizer and/or herbicides into the soil in a one-pass tillage operation.

20 Claims, 1 Drawing Sheet

U.S. Patent  May 2, 1989  4,825,782
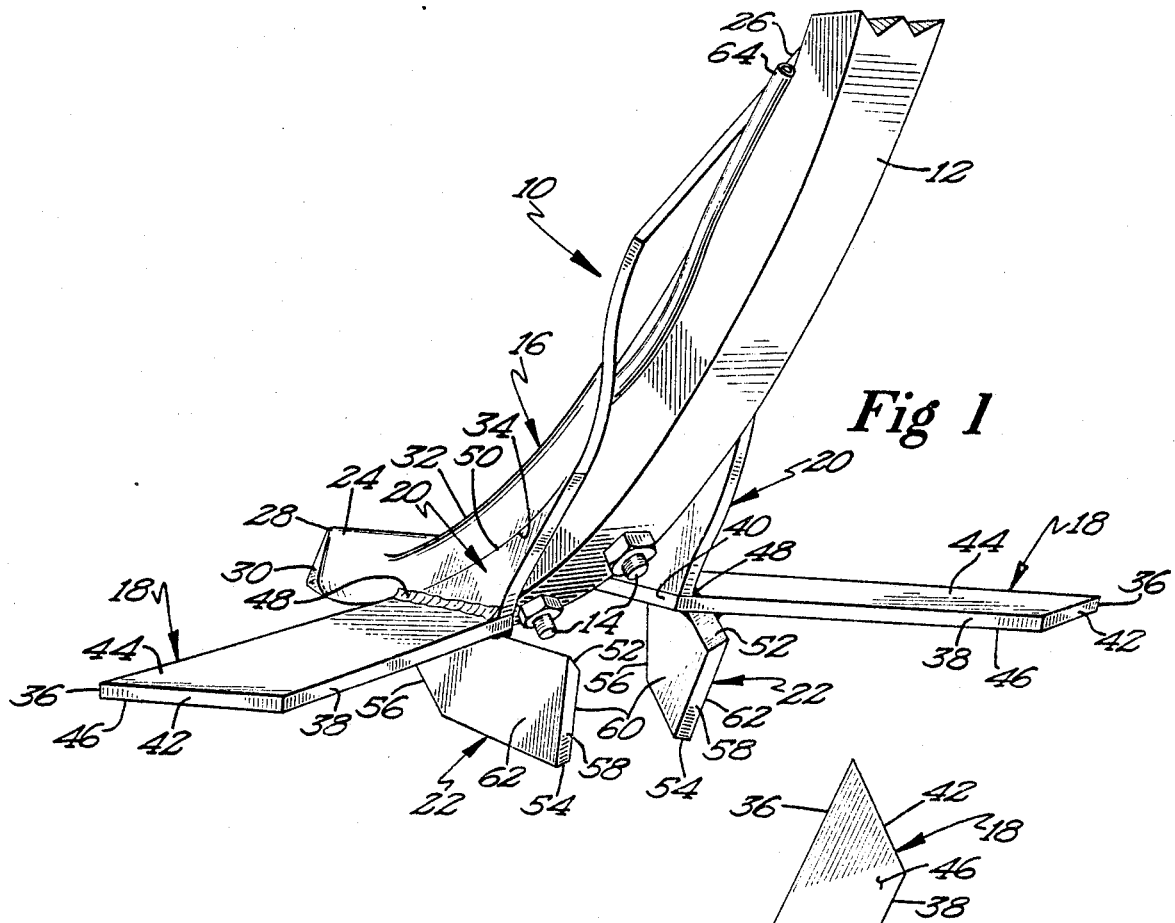
Fig 1
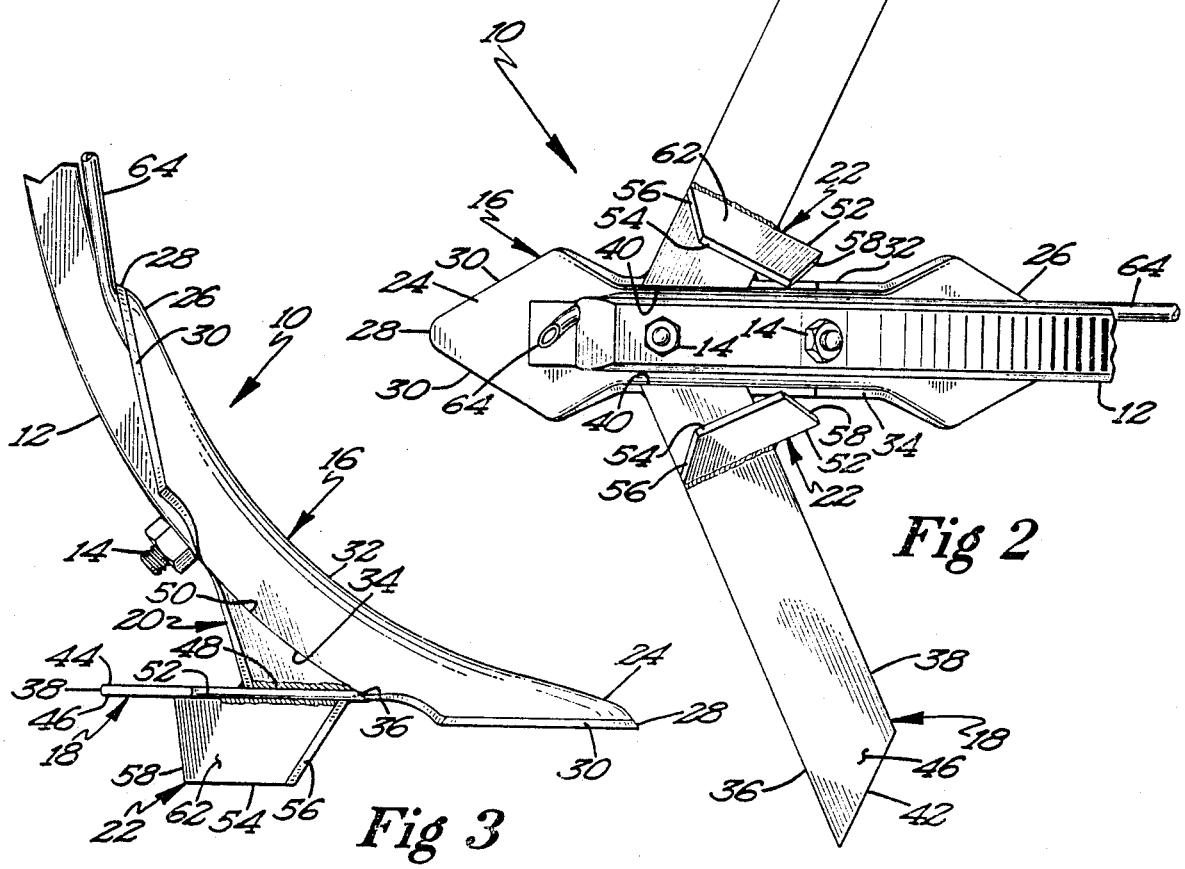
Fig 2
Fig 3

SWEEP-SPIKE COMBINATION TILLAGE TOOL

BACKGROUND

The present invention relates generally to tillage tools, and particularly to sweep-spike combination tillage tools.

Implements equipped with spike-type shovels are utilized for deep tillage, which is especially advantageous where penetration in hard soils is desired. However, due to the wide shank spacing in the range of 12 inches (30 cm), too much soil is left untilled or unloosened between the spike-type shovels. This is disadvantageous for several reasons. First, plant and weed growth in these spaces escape tillage. Further, this untilled or unloosened soil has reduced aeration and poor moisture absorption. Additionally, spike-type shovels will not adequately incorporate granular herbicides or fertilizers.

Implements equipped with sweep-type shovels till and loosen most of the soil to clip all or most plants and weeds in the soil and to provide better aeration and moisture absorption. However, sweep-type shovels have poor penetration and reduced deep tillage, especially in hard soils. Due to this poor penetration, sweep-type shovels may not incorporate granular materials in the desired manner.

In order to overcome these disadvantages of prior shovels, numerous tillage operations are required to assure loose ground for absorption of liquid or vapor-type fertilizers and to otherwise prepare the soil for advantageous crop growth. Such multiple pass tillage operations are disadvantageous as fuel, time, and labor are wasted, excessive wear and tear on the implements occur, and more soil compaction occurs.

Thus, a need exists for a tillage tool allowing a one-pass tillage operation on fall crop stubble or fallow ground. Depending on soil texture and conditions, this one-pass operation should be able to till, fertilize, and incorporate granular fertilizer and/or herbicides into the soil. Savings in time, fuel, and wear and tear on equipment as well as reduced soil compaction will occur by the reduced number of passes over a field. Further, the tillage operation should allow crop residue to remain on the soil surface to cut down on water and wind erosion.

SUMMARY

The present invention solves these needs and problems in tillage by providing, in the most preferred form, a sweep-spike combination tillage tool including generally horizontal sweep blades located behind a spike and above the point of the spike. Specifically, the front corners of the sweep blades between their front cutting edges and inside edges are integrally connected to the side edges of the spike. Gussets are provided integrally connected generally perpendicular to the inside edges of the sweep blades and generally tangentially to the side edges of the spike to provide cantilever mounting of the sweep blades and to provide support for soil passing over the spike and the sweep blades at their interconnection.

In another aspect of the present invention, furrow fillers are provided having top edges integrally connected to the bottom faces of the sweep blades for moving the soil behind the implement shank and the gussets.

It is thus an object of the present invention to provide a novel sweep-spike combination tillage tool.

It is further an object of the present invention to provide such a novel sweep-spike combination tillage tool which allows a one-pass tillage operation.

It is further an object of the present invention to provide such a novel sweep-spike combination tillage tool which has deep tillage and penetration ability It is further an object of the present invention to provide such a novel sweep-spike combination tillage tool which tills and loosens all soil.

It is further an object of the present invention to provide such a novel sweep-spike combination tillage tool which cuts roots of plants and weeds.

It is further an object of the present invention to provide such a novel sweep-spike combination tillage tool which incorporates granular materials.

It is further an object of the present invention to provide such a novel sweep-spike combination tillage tool which saves fuel, time, labor, and wear and tear on equipment.

It is further an object of the present invention to provide such a novel sweep-spike combination tillage tool which reduces soil compaction.

It is further an object of the present invention to provide such a novel sweep-spike combination tillage tool which leaves crop residue on the soil surface.

It is further an object of the present invention to provide such a novel sweep-spike combination tillage tool which provides better aeration and water absorption of the soil.

It is further an object of the present invention to provide such a novel sweep-spike combination tillage tool which has no moving or adjustable parts.

It is further an object of the present invention to provide such a novel sweep-spike combination tillage tool formed of one piece.

It is further an object of the present invention to provide such a novel sweep-spike combination tillage tool of a simple design.

It is further an object of the present invention to provide such a novel sweep-spike combination tillage tool which is cost effective.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a rear perspective view of a sweep-spike combination tillage tool according to the preferred teachings of the present invention.

FIG. 2 shows a bottom plan view of the sweep-spike combination tillage tool of FIG. 1.

FIG. 3 shows a side elevational view of the sweep-spike combination tillage tool of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "end", "side", "edge", "first", "second", "front", "rear", "behind", "forward", "inside", "outside", and similar terms are used herein, it should be understood that these terms have reference only to the structure shown in the drawings as it would appear to a person viewing the drawings and are utilized only to facilitate describing the invention.

DESCRIPTION

A sweep-spike combination tillage tool according to the preferred teachings of the present invention is shown in the drawings and generally designated 10. Tool 10 is adapted to be removably connected such as by bolts 14 to a standard or shank 12 of a plow or other tillage implement.

Tool 10 generally includes a spike 16, sweep blades 18, gussets 20, and furrow coverers or fillers 22. In the most preferred form, spike 16 includes dual ends 24 and 26 which are generally the shape of a flat isosceles triangle and specifically include a point 28 having first and second side edges 30 extending symmetrically therefrom. The central portion 32 of spike 16 located between ends 24 and 26 is generally arcuate in cross section and includes parallel side edges 34 which are contiguous with but spaced inwardly from the free ends of side edges 30. Thus, central portion 32 wraps itself around shank 12 with side edges 34 being located behind and inside the free ends of side edges 30. In the most preferred form, central portion 32 includes socket openings for receiving bolts 14 allowing removable connection of tool 10 to shank 12. Spike 16 is arcuate in configuration from end 24 to end 26 along its face such that end 24 is located forward and below end 26 and presents an incline when spike 16 is secured to shank 12 with bolts 14 extending through central portion 32. In the most preferred form, side edges 30 may be hard surfaced to prolong service.

Sweep blades 18 are flat and have the shape of a trapezoid. Specifically, blades 18 include a front, cutting edge 36, a rear edge 38 parallel to front edge 36, an inside edge 40 which extends at an angle in the range of 70° from front edge 36, an outside edge 42 which extends at an angle in the range of 50° from front edge 36, a top face 44, and a bottom face 46. Sweep blades 18 are integrally secured behind spike 16 such that faces 44 and 46 are generally horizontal and located generally above point 28 of end 24. The corners of sweep blades 18 between edges 36 and 40 are secured such as by welding to side edges 34 of central portion 32 slightly behind the free ends of side edges 30 of end 24. Specifically, if point 28 of spike 16 is used at a 5 inch (13 cm) depth, sweep blades 18 may be placed 3-to-4 inches (7½-to-10 cm) above point 28 allowing a 1-to-2 inch (2½-to-5 cm) depth of sweep blades 18 below the soil surface. Inside edge 40 extends generally straight back therefrom such that inside edge 40 and side edge 34 are located generally in the same vertical plane but with inside edge 40 extending generally horizontally outwardly from side edge 34 from their securement. In the most preferred form, sweep blades 18 according to the teachings of the present invention may angle downwardly from edge 40 to edge 42 such that the free ends of sweep blades 18 go deeper in the soil than edge 40 of sweep blades 18. In the most preferred form, cutting edge 36 may be hard surfaced to prolong service.

Due to the arcuate, rising nature of spike 16 and the generally horizontal nature of sweep blades 18, gussets 20 are provided extending therebetween. Specifically, gussets 20 are generally triangular in configuration having a first side 48 integrally secured to inside edges 40 of sweep blades 18 and a second side 50 integrally secured to side edges 34 of spike 16. In its most preferred form, gussets 20 extend generally tangentially from side edges 30 of spike 16 and are generally perpendicular to sweep blades 18.

Furrow fillers 22 are flat and have the shape of a trapezoid. Specifically, fillers 22 include a top edge 52, a bottom edge 54 parallel to top edge 52, a front edge 56, a rear edge 58, an inside face 60, and an outside face 62. In the most preferred form, rear edge 58 is generally perpendicular to edges 52 and 54 and front edge 56 extends at an angle in the range of 60° from top edge 52. In the most preferred form, the length of fillers 22 between edges 56 and 58 is larger, and specifically in the range of 50% larger than the width of blades 18 between edges 36 and 38. Top edges 52 of fillers 22 are integrally connected to bottom faces 46 of blades 18 with edges 56 of fillers 22 extending from edges 36 of sweep blades 18. In the most preferred form, sweep blades 18 are angled such that bottom edges 54 are located inwardly of top edges 52 and specifically with faces 60 extending at an angle in the range of but slightly less than 90° from bottom face. Further, sweep blades 18 are angled such that rear edges 58 are located inwardly of front edges 56 and specifically with front edges 56 being spaced greater than the free ends of side edges 30 and rear edges 58 being spaced less than the free ends of side edges 30 and extending at an angle in the range of 20° from the forward movement direction of tool 10 and generally perpendicular to front edge 36. In the most preferred form, front edges 36 may be hard surfaced to prolong service.

In the most preferred form, an applicator 64 such as an anhydrous knife is provided extending between tool 10 and shank 12 and having an outlet positioned behind point 28 and in front of the free end of shank 12 and in front of sweep blades 18 and furrow fillers 22. Applicator 64 may apply a vapor or liquid soil additive such as fertilizer for incorporation within the soil.

Now that the basic construction of tool 10 according to the teachings of the present invention has been explained, the operation and subtle features of the present invention can be set forth and appreciated. As the implement including shanks 12 is moved over the field, tool 10 according to the teachings of the present invention provides advantageous tillage of the soil. Specifically, spike 16 of tool 10 provides deep tillage and penetration ability as is obtained by prior spike-type shovels. Simultaneously, sweep blades 18 travel generally horizontally below the soil surface. Thus, sweep blades 18 cut the roots of plants and weeds between shanks 12 of the implement to insure that "green-up" does not occur in these spaces a short time such as several days or perhaps a week later. Further, the soil between shanks 12 of the implement is tilled and loosened by sweep blades 18 to provide better aeration and water absorption of the soil. Furrow fillers 22 channel the soil loosened by point 28 of end 24 behind shank 14 and due to the reduced spacing of furrow fillers 22 forces the soil upward between furrow fillers 22 behind shank 14 and between gussets 20. Thus, the soil directly behind the center of tool 10 is moved by furrow fillers 22 to cover any vapor and/or liquid fertilizer materials applied by applicator 64.

Tool 10 according to the teachings of the present invention includes an advantageous construction to help insure that desired penetration by spike 16 can occur. First, sweep blades 18 are spaced above point 28 of end 24. Thus, although sweep blades 18 may restrict the penetration of tool 10 into the soil, this spacing above point 18 insures that spike 16 obtains the depth penetration required in one-pass tillage. Further, it can be appreciated that gussets 20 according to the teachings of the present invention provide cantilever mounting of sweep blades 18 from side edges 34 of central portion 32 of spike 16. Thus, gussets 20 prevent outside edges 42 of sweep blades 18 from rising and/or prevent rear edges 38 of sweep blades 18 from rising. However, gussets 20 according to the teachings of the present invention provide synergistic cooperation between spike 16 and sweep blades 18. Specifically, since the sweep blades 18 are generally behind spike 16 due to the interconnection of the front corner of sweep blades 18 to side edges 34 of spike 16, interference with the movement and operation of spike 16 through the soil is minimized by the presence of sweep blades 18. For example, due to gussets 20, it is unnecessary to secure sweep blades 18 forward of side edges 34 which would tend to cause the soil to push up against the bottom of sweep blades 18 and thus reduce the penetration of tool 10. Similarly, end 24 may be generally flat and is not required to include a bulky construction for strength which also tends to reduce the penetration of tool 10.

Further, gussets 20 according to the teachings of the present invention synergistically cooperate with furrow fillers 22, sweep blades 18, and spike 16 to provide advantageous tillage. Specifically, gussets 20 capture the soil rising from between furrow fillers 22 behind shank 12 to cover the vapor and/or liquid fertilizer materials applied by applicator 64. Additionally, gussets 20 according to the teachings of the present invention provide a continuation of the soil engaging surfaces of spike 16 and provide support for the soil passing over the soil engaging surfaces of spike 16 and sweep blades 18 at their interconnection.

Thus, utilizing the present invention and specifically due to the synergistic cooperation of spike 16, sweep blades 18, gussets 20, and furrow fillers 22 resulting in tilled and loosened soil over a substantially wider area, the soil tends to fill in behind shank 12 and tool 10 such that the soil is not as ridged as when prior spike-type shovels are utilized. Additionally, granular materials such as herbicides or fertilizers are thoroughly incorporated to desirable depths and extent. Additionally, since sweep blades 18 travel below the soil surface, the top surface of the areas between shanks 12 are generally undisturbed such that crop residue generally remains thereon obtaining ecological benefits including cutting down on water and wind erosion.

Tool 10 according to the teachings of the present invention is cost-effective from a production as well as use standpoint. Particularly, tool 10 according to the teachings of the present invention tills, fertilizes, and incorporates granular fertilizer and/or herbicides into the soil and allows a one-pass tillage operation on fall crop stubble or fallow ground. Such a multiple function operation saves time, fuel, and wear and tear on equipment and results in less soil compaction.

Further, due to the simple design, tool 10 according to the teachings of the present invention is of one-piece construction including no moving or adjustable parts. Particularly, all parts are integrally connected as a single unit which obtains many advantages. Specifically, no special shanks or other attachments are required to secure the components to the tillage implement. Further, no attachment holes are required for attachment of the components of tool 10 together which may result in weak spots in tool 10. Additionally, tool 10 according to the teachings of the present invention may be easily and rapidly attached to shank 12 by the use of only two bolts 14 and does not require field assembly or the like.

Dual ends 24 of spike 16 allow tool 10 to be turned over on shank 12 such that end 26 can be utilized in the manner of prior spike-type shovels after removal of worn sweep blades 18 and furrow fillers 22 such as by a cutting torch.

It can be appreciated that tool 10 according to the teachings of the present invention can be used on any or all makes, models, and series of chisel plows. Additionally, tool 10 according to the teachings of the present invention can be adapted for light duty field cultivators. The angle, bevel, and heights from point 28 of end 24 may differ depending upon the angle or pitch of shanks 12 of the implements to which tool 10 is secured.

Now that the basic teachings of the present invention have been explained, many extensions and variations will be obvious to one having ordinary skill in the art. For example, although spike 16 of tool 10 is shown as including dual ends 24 and 26 according to the preferred teachings of the present invention, it will be immediately apparent to one skilled in the art that spike 16 may be manufactured as including a single point if reuse is not desired and/or to reduce manufacturing costs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Sweep-spike combination tillage tool for attachment to a shank of a tillage implement comprising, in combination a spike having a first end and a central portion terminating in a second end, with the spike being arcuate in configuration between the first end and the second end, with the first end being a generally flat isosceles triangle including a point and first and second side edges extending symmetrically therefrom, with the central portion having a generally arcuate cross section to wrap around the shank and including first and second side edges located on opposite sides of the shank; means formed in the central portion of the spike for allowing removable connection to the shank; first and second sweep blades including a front cutting edge and an inside edge, with the inside edges of the sweep blades adjacent the front cutting edges being integrally connected to the side edges of the spike and extending rearwardly generally horizontally therefrom, with the sweep blades being spaced above the point; and first and second gussets having a generally triangular configuration including a first side and a second side, with the first side of the gusset being integrally connected generally perpendicular to the inside edge of the sweep blade and with the second side of the gusset being integrally connected generally tangentially to the side edge of the spike, with the gussets providing cantilever mounting of the sweep blades and providing support for the soil passing over the spike and the sweep blades at their interconnection.

2. The sweep-spike combination tillage tool of claim 1 wherein the implement further includes means having an outlet positioned adjacent and behind the first end of the spike for applying a soil additive; wherein the sweep blades have a bottom face; and wherein the sweep-spike combination tillage tool further comprises, in combination: means integrally connected to the bottom faces of the sweep blades for moving the soil behind the shank and gussets for covering the soil additive applied by the applying means.

3. The sweep-spike combination tillage tool of claim 2 wherein the moving means comprises, in combination: first and second furrow fillers having top edges and being generally flat, with the top edge of the furrow filler being integrally connected to the bottom face of the sweep blade.

4. The sweep-spike combination tillage tool of claim 3 wherein the top edge of the furrow filler has a length greater than and extends behind the width of the sweep blade.

5. The sweep-spike combination tillage tool of claim 4 wherein the furrow fillers have inside faces, with the furrow fillers being integrally connected to the bottom faces of the sweep blades in a manner to direct the soil to move behind the shank and gussets.

6. The sweep-spike combination tillage tool of claim 5 wherein the furrow fillers have a front edge and a rear edge, with the furrow fillers being integrally connected to the bottom faces of the sweep blades with the front edges of the first and second furrow fillers being spaced apart greater than the spacing between the rear edges of the first and second furrow fillers.

7. The sweep-spike combination tillage tool of claim 6 wherein the furrow fillers have bottom edges, with the furrow fillers being integrally connected to the bottom faces of the sweep blades with the bottom edges of the first and second furrow fillers being spaced apart less than the spacing between the top edges of the first and second furrow fillers.

8. The sweep-spike combination tillage tool of claim 7 wherein the furrow fillers have the shape of a trapezoid, with the top and bottom edges being parallel, with the front edge of the furrow filler extending at an angle in the range of 60° from the top edge of the furrow filler.

9. The sweep-spike combination tillage tool of claim 5 wherein the furrow fillers have bottom edges, with the furrow fillers being integrally connected to the bottom faces of the sweep blades with the bottom edges of the first and second furrow fillers being spaced apart less than the spacing between the top edges of the first and second furrow fillers.

10. The sweep-spike combination tillage tool of claim 3 wherein the sweep blades have the shape of a trapezoid and include a rear edge generally parallel to the front cutting edge, with the inside edges of the sweep blades extending at an angle in the range of 70° from the front edges of the sweep blades.

11. The sweep-spike combination tillage tool of claim 10 wherein the top edges of the furrow fillers extend generally perpendicular to the front cutting edges of the sweep blades.

12. The sweep-spike combination tillage tool of claim 1 wherein the sweep blades have the shape of a trapezoid and include a rear edge generally parallel to the front cutting edge, with the inside edges of the sweep blades extending at an angle in the range of 70° from the front edges of the sweep blades.

13. The sweep-spike combination tillage tool of claim 1 wherein the second end of the spike is a generally flat isosceles triangle including a point and first and second side edges extending symmetrically therefrom.

14. The sweep-spike combination tillage tool of claim 1 further comprising, in combination: first and second furrow fillers having top edges and being generally flat, with the top edges of the furrow fillers being integrally connected to the bottom faces of the sweep blades for moving the soil behind the shank and gussets.

15. The sweep-spike combination tillage tool of claim 14 wherein the top edge of the furrow filler has a length greater than and extends behind the width of the sweep blade.

16. The sweep-spike combination tillage tool of claim 15 wherein the furrow fillers have inside faces, with the furrow fillers being integrally connected to the bottom face of the sweep blades in a manner to direct the soil to move behind the shank and gussets.

17. The sweep-spike combination tillage tool of claim 16 wherein the furrow fillers have a front edge and a rear edge, with the furrow fillers being integrally connected to the bottom faces of the sweep blades with the front edges of the first and second furrow fillrs being spaced apart greater than the spacing between the rear edges of the first and second furrow fillers.

18. The sweep-spike combination tillage tool of claim 17 wherein the furrow fillers have bottom edges, with the furrow fillers being integrally secured to the bottom faces of the sweep blades with the bottom edges of the first and second furrow fillers being spaced apart less than the spacing between the top edges of the first and second furrow fillers.

19. The sweep-spike combination tillage tool of claim 15 wherein the inside edges of the sweep blades extend at an angle in the range of 70° from the front edges of the sweep blades.

20. The sweep-spike combination tillage tool of claim 19 wherein the top edges of the furrow fillers extend generally perpendicular to the front cutting edges of the sweep blades.

* * * * *